Figure 1:
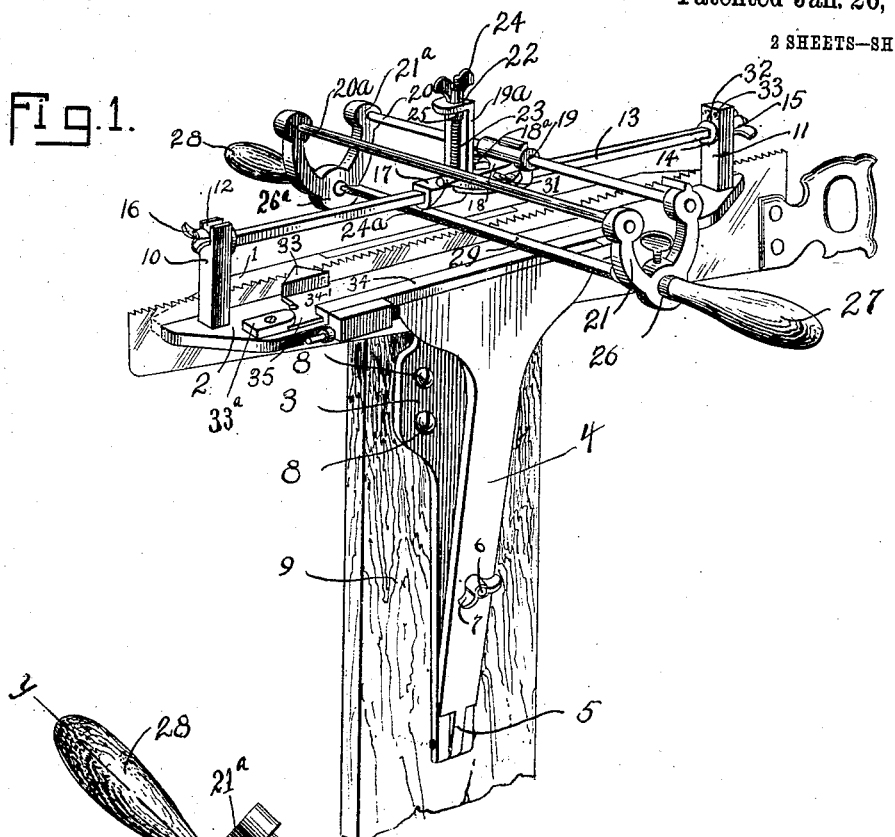

T. BECKER.
SAW SHARPENER.
APPLICATION FILED MAR. 22, 1905.

910,893.

Patented Jan. 26, 1909.
2 SHEETS—SHEET 1.

Witnesses
Inventor.
Theobald Becker,
by David Moore,
Attorney.

T. BECKER.
SAW SHARPENER.
APPLICATION FILED MAR. 22, 1905.
910,893.
Patented Jan. 26, 1909.
2 SHEETS—SHEET 2.
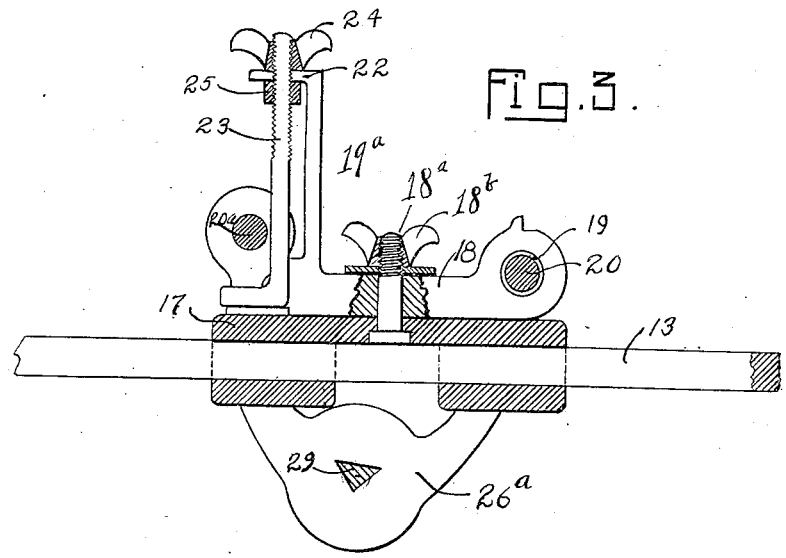
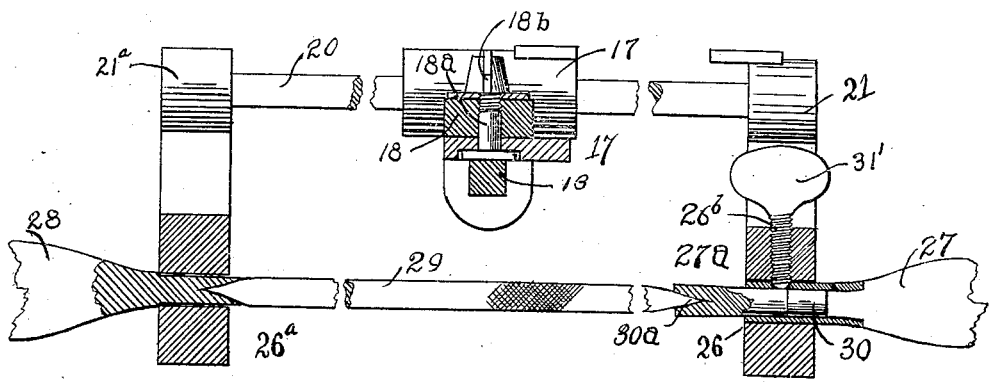
Witnesses
Philip Terrell
J. Mae Wright
by
Inventor
Theobald Becker,
Daniel Moore.
Attorney.

UNITED STATES PATENT OFFICE.

THEOBALD BECKER, OF PITTSBURG, PENNSYLVANIA.

SAW-SHARPENER.

No. 910,893.  Specification of Letters Patent.  Patented Jan. 26, 1909.

Application filed March 22, 1905. Serial No. 251,375.

*To all whom it may concern:*

Be it known that I, THEOBALD BECKER, a citizen of the United States, residing at Pittsburg, in the county of Allegheny and State of Pennsylvania, have invented a new and useful Improvement in Saw-Sharpeners, of which the following is a specification.

My invention relates to saw sharpeners, and my principal object is to produce a device for this purpose which shall be simple and inexpensive in construction, and which shall embrace certain details of construction and arrangement of parts which shall provide for the successful and accurate sharpening of saws of varying sizes, as well as providing for, and adapting itself to, the varying depths of the teeth thereof, as well as the angle at which said teeth are to be sharpened.

A further object of the invention is to provide means whereby the saw may always be accurately adjusted so as to rest in the same horizontal plane with the sharpening device, thereby permitting the removal of the saw from the sharpener, and insuring its re-insertion therein, in the same horizontal plane, and so adapting the device for use to sharpen saws whose length may exceed the length of the device.

A further object of the invention is to provide means for determining the downward movement of the sharpening means, and limiting such downward movement so as to give an equal and uniform depth to the teeth of the saw.

A further object of the invention is to provide means for determining the angle at which the teeth shall be beveled, when necessary, and for securing and maintaining the parts in such position so that the same angle will be maintained throughout.

A further object of the invention is to provide means whereby the sharpening means may be tilted, or brought out of the horizontal, and maintained at such tilted position, so as to bevel the teeth at their base extremities.

With these and other objects in view, my invention may be said to comprise suitable clamps for receiving the saw blade, means for gaging said blade so as to bring its teeth into proper parallel relation with the said clamps, a file or other suitable sharpening means disposed above the teeth, and being capable of vertical and longitudinal movement.

My invention further comprises certain novel features of construction and arrangement of parts, all of which will be hereinafter more fully described and particularly pointed out in the appended claim.

Figure 2:
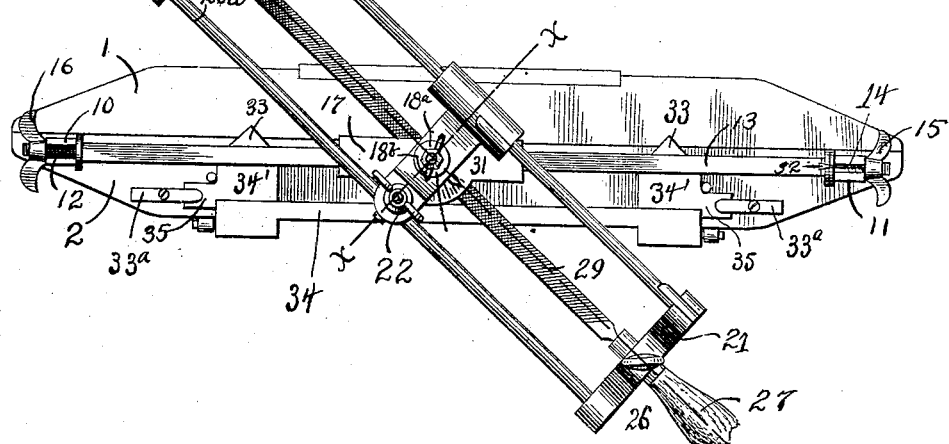

To more fully comprehend the nature of my invention, however, and the manner in which the same is or may be carried into effect, reference must be had to the accompanying drawings, forming part of this specification, whereon similar reference numerals indicate corresponding parts in all the figures, and where:

Figure 1, represents a perspective view of a saw sharpener constructed according to my invention, a saw blade being shown in position therein. Fig. 2, represents an enlarged plan view thereof. Fig. 3, represents a central vertical section of the carriage taken on the line $x\ x$ of Fig. 2. Fig. 4, represents a longitudinal section, enlarged, on the line $y$—$y$ of Fig. 2.

I will now proceed to describe my invention in connection with said drawings—premising that practical means are there shown for carrying the same into successful operation—and will then point out the novel features in the claim, it being understood, however, that in setting forth the several details thereof, I do not limit myself to their precise construction, as they may be amplified, modified, and otherwise changed without departing from the spirit or sacrificing any of the advantages of my invention.

Referring to said drawings: 1 and 2, designate two clamping jaws which are formed upon the upper extremities of arms 3 and 4, the arms being pivotally connected at their lower ends, as represented at 5, and the opening and closing of said jaws are controlled by means of a bolt 6, and thumb nut 7, the former being secured in one jaw, and passing through an opening in the other, its shank being threaded to receive said thumb-nut 7, as shown.

The jaws 1 and 2, may be of any desired length, but I prefer, in practice, to make them comparatively short so as to occupy but little space in order that the sharpener may be carried about from place to place, with little or no difficulty; and the arm 3, is provided with perforations to receive appropriate screws 8, by which the device may be firmly secured to a suitable board 9, which latter may, in turn, be fastened to any convenient support within a room or building, or which may, if desired, be adjusted and held within any ordinary vise.

The jaw 2, is provided with uprights or posts 10 and 11, the former having in its upper end an open slot 12, adapted to receive one end of a rod 13, while the post 11, has a similar slot 14, to receive the opposite end of said rod. The body portion of the rod 13, is preferably square in transverse section, but its terminals, or those portions which rest in the slots in the uprights or posts, are rounded and reduced so as to form shoulders at the respective ends of the body portion of the rod, which abut the inner faces of the uprights 10 and 11. The rounded ends of the rod 13, project through the slots 12 and 14, and are threaded to receive appropriate thumb-nuts 15 and 16, by which means, it will be apparent, the rod 13, may be adjusted either as to its elevation above the clamping jaws 1 and 2, or rotated in one direction or the other to tilt or give any desired inclination to the filing or sharpening devices, which latter are supported on, and carried by, said rod as hereafter described. The sharpening or filing devices are here shown as comprising a sliding carrier or block 17, supported by, and adapted to move along, the bar 13, and upon the upper face of which is pivotally supported a bracket 18, the latter having upon one end a sleeve 19. The file holding portion of the device consists of two end brackets 21, 21$^a$ connected by spaced rods 20, 20$^a$, the rod 20 adapted to slidably engage the sleeve 19. The bracket 18 is also provided with a vertical extension 19$^a$, with the upper end 22 extended laterally and perforated to receive a rod 23. The upper end of the rod 23 is threaded to receive a thumb-nut 24, and its lower extremity is formed with a shoulder or projection 24$^a$, which is adapted to engage with, and limit the downward movement of the rod 20$^a$. A lock-nut 25, is arranged upon the rod 23, beneath the bent extremity 22 of the extension 19$^a$, for the purpose of maintaining said rod in fixed position after proper adjustment, as will be understood. The end members 21 and 21$^a$ have appropriate bearings 26 and 26$^a$, therein to receive handles 27 and 28, which are grasped by the hands of the user during the operation or process of sharpening the saw. The inner ends of these handles are provided with sockets to receive the ends of a suitable file 29, and the socket in the handle 27, is movable, so as to be capable of adjustment to compensate for the varying lengths of files which may be used.

As shown in Fig. 4, the end of the handle 27, is provided with a ferrule or sleeve 27$^a$, which receives within it a short plug 30, the latter having in its outer end a recess 30$^a$, to receive one end of the file, and the bracket 21, is provided with a threaded opening 26$^b$, for the reception of a thumb-screw 31', whose lower end passes through a perforation in the ferrule or sleeve 27$^a$, and bears upon the plug 30,—thus the latter may be moved within said ferrule or sleeve, in either direction, to compensate for, and adjust it to, the different lengths of files.

The pivotal connection between the sliding block 17, and the bracket 18, is here shown as comprising a bolt 18$^a$, which passes up through registering perforations therein, its head being countersunk within the block 17 and its opposite end being threaded to receive a thumb-nut 18$^b$, by which means, it will be apparent, the bracket and its attached swinging carriage may be turned to any desired angle with relation to the clamping jaws 1 and 2, and firmly secured by said nut. And in order to accurately gage such angle and to enable the user to set the file at the same, or at any different, angle, I provide a series of graduations on the base of the block 17, with which a suitable finger or pointer 31, on the bracket 18, will register, thus enabling the file to be set at any predetermined or desired angle, with relation to the saw blade. A similar arrangement is provided at one end of the rod 13, to determine the tilt of the carriage. In this instance, a finger or pointer 32, is secured to the rod 13, which will register with appropriate graduations on the inner face of the contiguous upright or post 11 on the clamping jaw 2.

The saws being of comparatively greater length than that of the jaws 1 and 2, it will be evident that the blade will have to be sharpened in sections, within the limit of the device, and in order to provide for the accurate re-insertion of said blade, I employ a convenient gage, which insures the same horizontal level to the teeth of the saws and thereby effects the same action of the file throughout their entire length. The said gage is herein shown as comprising a frame 34, hinged or pivotally connected to the jaw 2 and having near each end, an inwardly-projecting plate 34', each of said plates having a projecting finger 35, and having their free forward ends or edges bent upwardly and forwardly to form gage-points 33 which extend beyond the abutting edges of the jaws 1 and 2, and sufficiently above said jaws to permit of the saw being brought into proper position to be operated upon by the file. The gage points 33, when in the position shown in Figs. 1 and 2, rest upon the points of one or more teeth, at two spaced points, or, in other words, when the saw is inserted between the jaws 1 and 2, two or more teeth of the saw, at spaced points thereon, will contact with the gage-points, and thus insure the teeth of the saw being in the same elevation and in proper relation with the file to insure uniform sharpening. The said gage is secured in the position shown in Figs. 1 and 2 by means of latches 33ª pivotally secured to the jaw 2 and adapted to be moved on their pivots so as to be engaged with the fingers 35 and thus hold the gage-points in proper position while the saw blade is being inserted between the jaws, and, after the blade has been inserted, and the jaws clamped therewith, the latches are turned on their pivots so that the frame 34 may be swung back on its hinges, carrying the gage-points therewith and out of the way of the file, whereupon, the operation of sharpening may be commenced.

As before stated the rod 13 together with the file supporting mechanism is rotatable in the standards 10, 11, and adapted to be clamped in any desired position between the nuts 15, 16, and the rod B and its attachments is also adjustable vertically in the slots 12, 14, to regulate the vertical position of the file holder. By this simple means the angularity of the cut of the file may be easily controlled, and any required bevel imparted to the saw teeth, as will be obvious.

The operation of my invention is as follows:—The saw blade, having been secured between the clamping jaws, and the rod 23, adjusted, as previously described, so as to determine and limit the downward movement of the swinging carriage, the latter will swing and be guided in its movement back and forth, in the guide-eye 19, on the bracket 18. The angle and tilt of the carriage having also been determined, in the manner described, the operator will grasp and bear upon the handles 27 and 28, guiding the file between the teeth, and the pressure upon said handles will serve to gradually lower the swinging carriage at its free side, during the operation of sharpening, until its rod 20ª, shall strike the shoulder 24ª, on the rod 23, which will effectively check its further descent, and thereby insure an equal and uniform depth to each successive tooth.

From the foregoing, taken in connection with the drawings, it will be apparent that my invention provides in a simple and inexpensive manner, a saw sharpener which is particularly well adapted for the purposes intended, and that, by reason of the graduations, and other features of adjustment, the artisan is enabled to accurately gage the depth intended to be given to the teeth as well as to maintain such depth and give such bevel thereto, as will be best suited to his peculiar needs.

Having thus described my invention, what I claim and desire to secure by Letters Patent, is as follows.

In a saw sharpener, a pair of hinged jaws for clamping the saw blade, a file holding device carried by one of said jaws, a gage device comprising a body pivoted on one of said jaws, plates formed integral with said body, integral ears on said plates, latches arranged to contact with said ears to hold said plates in operative position, fingers on said plates, said fingers being above the plane of the plates and extending over the saw teeth when in operative position.

In testimony whereof I have signed my name to this specification in the presence of two subscribing witnesses.

THEOBALD BECKER.

Witnesses:
 JOHN H. LAUR,
 FRANK C. WILLS.